United States Patent [19]

Taylor et al.

[11] 4,414,546
[45] Nov. 8, 1983

[54] APPARATUS FOR AND METHODS OF IDENTIFYING HORSES BY SCANNING THEIR CHESTNUTS

[75] Inventors: Verner L. Taylor; Joseph B. Sprowls, III, both of Broomfield; James R. Ayer, Louisville, all of Colo.

[73] Assignee: Robert G. Boorman, Billings, Mont.

[21] Appl. No.: 85,384

[22] Filed: Oct. 16, 1979

[51] Int. Cl.³ .......................... H04Q 9/00; G06K 9/00
[52] U.S. Cl. ...................................... 340/825.3; 382/2
[58] Field of Search ............... 340/149 R, 146.3 E, 340/146.3 Q, 146.3 AC, 146.3 AQ, 146.3 MA, 825.3; 235/455; 382/2

[56] References Cited

U.S. PATENT DOCUMENTS

| | | | |
|---|---|---|---|
| 3,624,604 | 11/1971 | Gibbard | 340/146.3 R |
| 4,015,240 | 3/1977 | Swonger et al. | 340/146.3 E |
| 4,061,380 | 12/1977 | Carnahan et al. | 340/146.3 MA |
| 4,151,512 | 4/1979 | Riganati et al. | 340/146.3 E |
| 4,179,686 | 12/1979 | Bonicalzi et al. | 340/146.3 Q |
| 4,180,800 | 12/1979 | Isshiki et al. | 340/146.3 MA |
| 4,183,013 | 1/1980 | Agrawala et al. | 340/146.3 AC |
| 4,186,378 | 1/1980 | Moulton | 340/146.3 E |
| 4,236,082 | 11/1980 | Butler | 340/146.3 E |
| 4,250,488 | 2/1981 | Haupt | 235/455 |
| 4,315,245 | 2/1982 | Nakahara et al. | 235/455 |

Primary Examiner—Donald J. Yusko
Attorney, Agent, or Firm—Barnes & Thornburg

[57] ABSTRACT

The identity of horses is established by optically scanning the four "chestnuts" located on the insides of their legs to generate digital numbers corresponding to the width, height and area of each chestnut. These numbers are encoded digitally with an application number assigned to the individual horse and the serial number of the equipment performing the scan to produce a code which is then stored on tape within a tape recorder. The code is thereafter transmitted to a central data bank for future reference so that the identity of the horse can be subsequently checked to prevent fraudulent and mistaken substitution of horses. The apparatus and method is also useful in identifying lost horses and in controlling theft and disease.

12 Claims, 17 Drawing Figures

APPARATUS FOR AND METHODS OF IDENTIFYING HORSES BY SCANNING THEIR CHESTNUTS

BACKGROUND OF THE INVENTION

1. Field of the Invention

The instant invention relates to methods of and apparatus for identifying horses; and more particularly, the instant invention relates to methods of and apparatus for identifying horses by recording and comparing the characteristics of their "chestnuts".

2. Problems and Prior Art Solutions

For thousands of years horses have been bred, traded, worked, raced and used for food by humans. When instant horses are of the same breed and have similar coloring they tend to look alike, which for thousands of years has caused confusion and encouraged fraudulent practices. Even though they may look alike, each horse is genetically unique and has physical and mental characteristics which differentiate it from every other horse. In the United States alone there are currently twelve million horses and the numbers are growing. Although horses are now rarely used for transportation, they are still used for racing, pleasure and food. Accordingly, there is a need for a positive identification technique to minimize both mistaken identity and the fraudulent practice of substituting similar horses at racetracks, sales and exhibits. Moreover help is needed in finding lost horses and in controlling both theft and infectious diseases.

As exemplified by U.S. Pat. Nos. 2,866,395 and 3,298,294, it is known that horses may be cataloged and identified by their "chestnuts", which are callous-like growths on the inside of each leg. Chestnuts are as individual to a horse as fingerprints are to a human. In the approach suggested by these patents the chestnuts are photographed and the photographs are used for visual identity checks. This technique has not been widely practiced because, among other reasons, there is no convenient method of rapidly processing, cataloging and accumulating information identifying large numbers of horses. In order to be commercially feasible, a horse identifying technique should be both certain and quick and should include as many horses as possible.

One rather widely practiced identification system utilizes numbers tattooed on the inside of a horse's lip. This approach is not particularly effective because tattoos can be easily changed and tend to fade as a horse ages. Consequently, deceptive substitution of one horse for another is rather easily accomplished at sales and in trading and racing. A more secure identification system is therefore needed.

The impact of modern mobility increases the need for improved identification systems. Modern mobility affects the horse business in two ways. First, it allows horse thieves, especially those who steal horses for meat, to steal a horse, transport it and have it slaughtered within a very short time. Even if the horse thief is caught red-handed, it can be difficult to prove a horse in his possession is one that has been stolen. The high price of horse meat is encouraging theft for this purpose at an accelerated rate. Secondly, modern mobility allows horses to be quickly transported from one state to another and one country to another. As horses cross borders they can carry disease, consequently there is a need for a positive identification system which can assist in health clearance and quarantine at state and national borders. From the owner's point of view, movement of a horse across a border is often frustrated because proper identification is not available for certifying the health of the horse. Accordingly, a quick and positive identification technique and system has become increasingly necessary.

SUMMARY OF THE INVENTION

In view of the foregoing considerations, it is a feature of the instant invention to provide new and improved methods of and apparatus for establishing the identity of horses, wherein the methods and apparatus rely upon the individualized characteristics of horse "chestnuts" in conjunction with current optical and data processing techniques.

In view of this feature, and other features, the instant invention contemplates apparatus for establishing the identity of a horse by coordinating a number assigned to the horse with a number relating to the characteristics of the horses's chestnuts. The apparatus includes means for scanning the horse's chestnuts to obtain data related to the width, height and area of the chestnuts and means for encoding the data with the assigned number to provide an identifying number.

Moreover, the instant invention contemplates a method of utilizing a data processing system to identify or authenticate a horse wherein the method comprises the steps of storing an assigned number particular to the horse, optically scanning at least one of the horses chestnuts, converting the results of the scan into digital signals relating to the width, height and area of the chestnut and combining the digital chestnut signals with the assigned number to produce an identifying number.

In addition to the aforecited method and apparatus, the instant invention contemplates storing the identifying number in a central data bank from whence the identifying number can be rapidly retrieved and checked.

BRIEF DESCRIPTION OF THE DRAWINGS

FIGS. 5A and B are perspective views of the scanner or camera utilized to scan the chestnuts;

FIG. 6 is a perspective view of the belt pack including the battery pack and tape recorder as well as printed circuit boards for data synthesis, interface encoding and modem circuitry;

DETAILED DESCRIPTION OF THE PREFERRED EMBODIMENT

Figures 1, 2, 3:
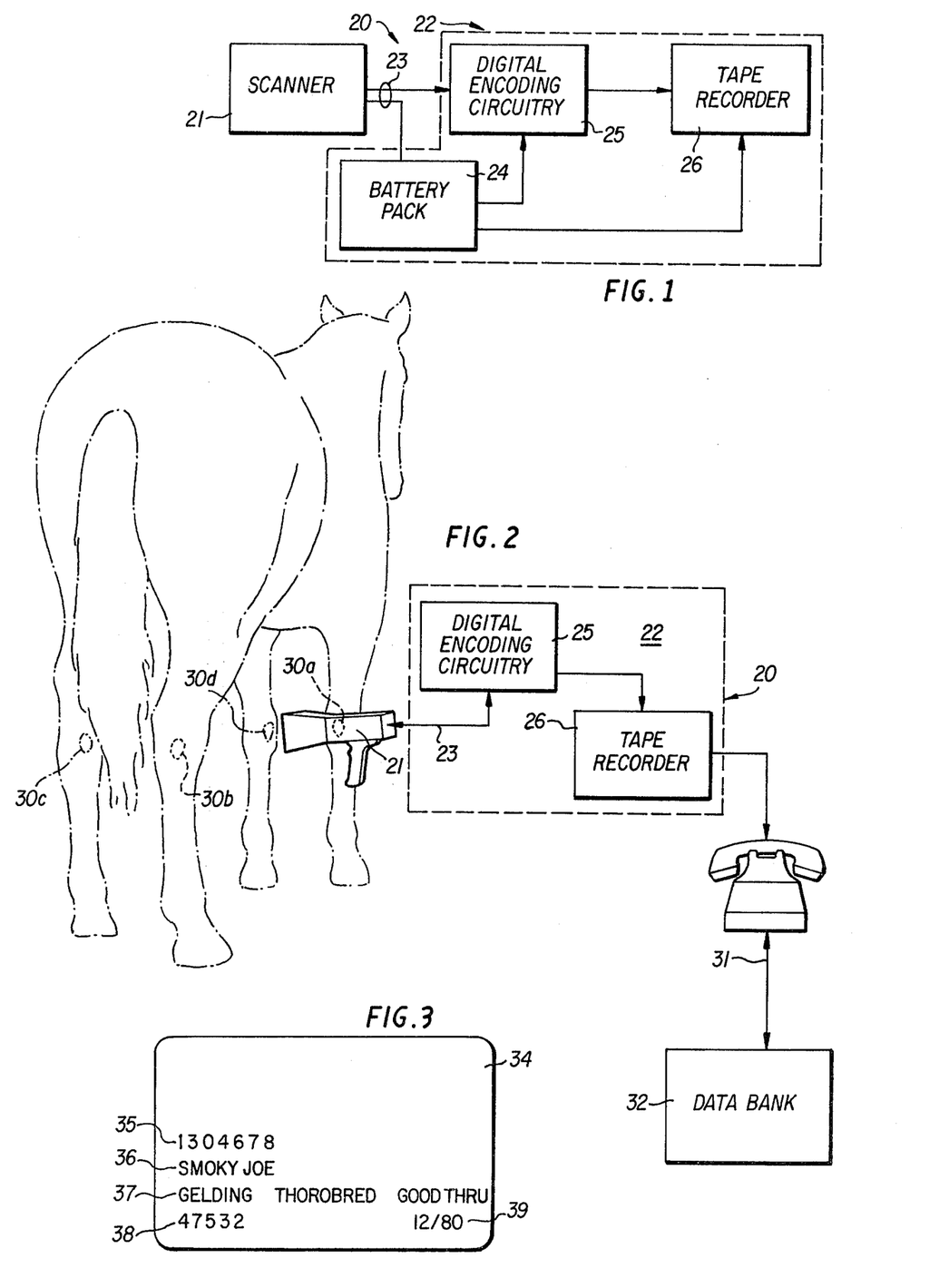
FIG. 1 is a diagramatical view showing the apparatus of the instant invention utilized to practice the method of the instant invention; wherein the apparatus includes a scanner or camera, battery pack, digital encoding circuitry and a tape recorder.
FIG. 2 is a diagramatical illustration showing a method of using the apparatus of FIG. 1 wherein the chestnuts on each of a horses legs are scanned and the data of the scan is forwarded via telephone lines, or the like, to a central data bank where it is stored and selectively retrieved.
FIG. 3 is a planar view of an identity card incorporating the data obtained from the horse and stored in the data bank.

FIGS. 1-3—Basic Components

Referring now to FIG. 1, there is shown an apparatus 20 according to the instant invention which is utilized in practicing the instant invention. The apparatus 20 includes an optical scanner designated generally by the numeral 21, which serves as a light sensing head, and a belt pack, defined by the dotted enclosure and designated generally by numeral 22, which is connected to the optical scanner by a cable 23. The belt pack 22 includes a battery pack 24, digital encoder circuitry 25 and a tape recorder 26. The apparatus 20 is portable and can be carried conveniently by one technician. The power necessary to operate the apparatus is provided by the battery pack 24. All circuitry is solid state in order to minimize the size and weight of the equipment.

Referring now to FIG. 2, where the method of utilizing the apparatus 20 is shown, the optical scanner 21 optically scans four "chestnuts" 30a-30d located on the inner surfaces of a horses legs. Preferrably, the chestnuts 30a-30d are scanned in sequence so that the resulting code is always consistent. For example, the chestnut 30a on the right front leg is scanned first; chestnut 30b on the right rear leg is scanned second; chestnut 30c on the left rear leg is scanned third, and chestnut 30d on the left front leg is scanned fourth. This data is transmitted by the cable 23 to the encoding circuitry 25 for processing and is recorded by the tape recorder 26. Preferrably, the encoding circuitry 25 also encodes a serial number assigned to the particular scanner used and an application number assigned to the horse being scanned. The information is stored on the tape in the tape recorder 26 and is transmitted over telephone lines 31 to a remote, central data bank 32 for storage and subsequent retrieval.

Referring now to FIG. 3, the central data bank 32 issues an identity card 34 which may be in the form of a plastic card and which has information thereon such as an identification number 35, the horse's name 36, sex and breed 37, a registration number 38 and date 39. The card 34 is carried by the horse's owner and is used for any purpose where horse identification is necessary or desirable, for example in transporting the horse, selling or trading the horse, and racing the horse. Primarily, the card 34 indicates that the identity of the horse has been established by using the system of the instant invention. The identity of the horse can be further assured by checking additional data stored at the central data bank 32 which is accessed by the identification number.

Preferably the identification number 35 is a two part number which includes both a computer file number and application number. The registration number 38 is assigned by an outside organization which identifies the horse as, for example, a quarter horse or a thoroughbred.

Figure 4:
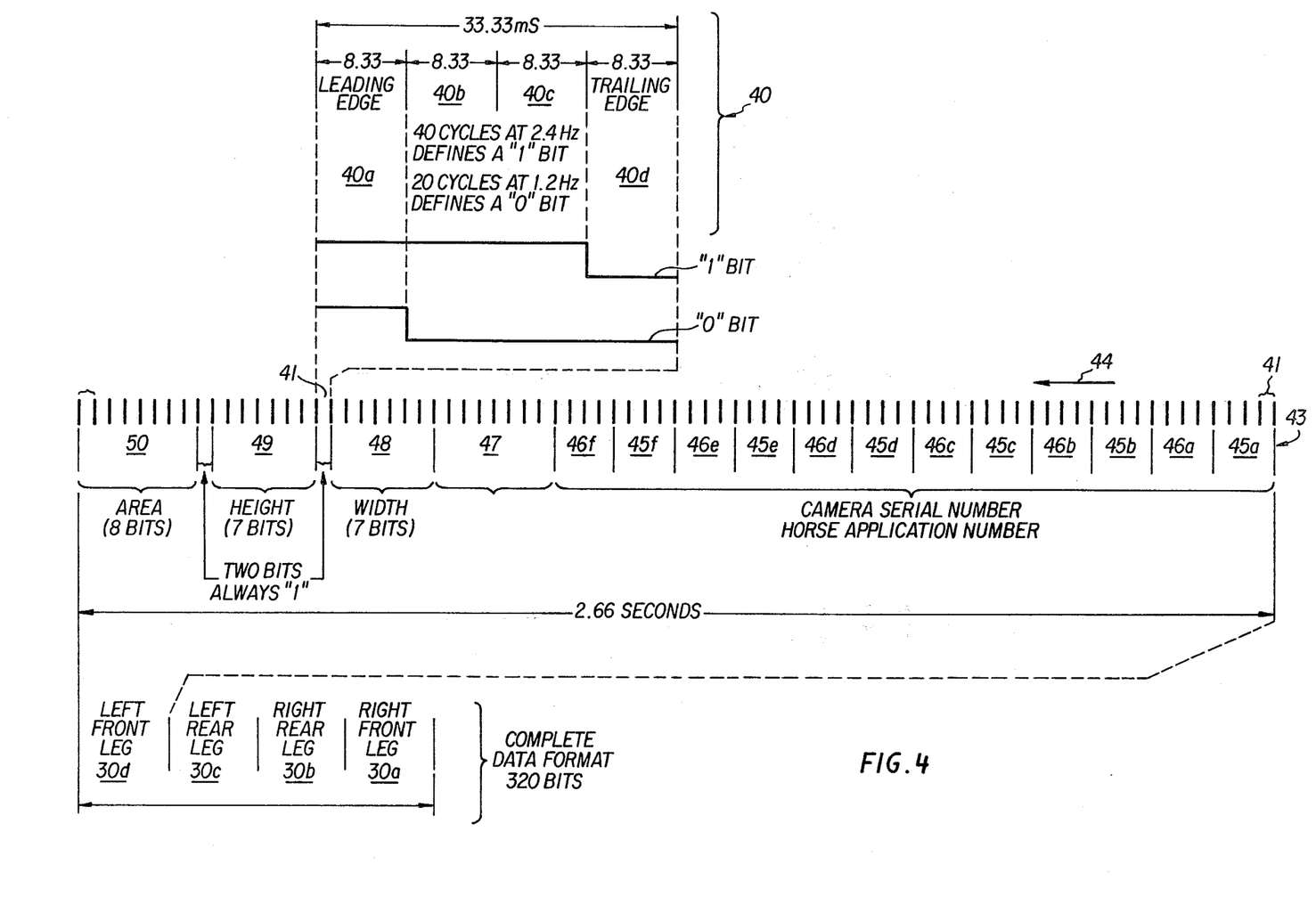
FIG. 4 is a diagram showing the data format obtained using the apparatus of the instant invention.

FIG. 4—DATA FORMAT FOR HORSE CODE NUMBER

Referring now to FIG. 4, there is shown a preferred embodiment of a data format of a code number identifying a single horse, which code number has derived and assigned digits and is stored digitally for subsequent use. In order to store the data on tape it is converted to a tone format, designated generally by the numeral 40, wherein each bit 41 is either high or low depending on the arrangement of tones within the bit frame defined by the tone format. A typical bit 41 is 33.33 milliseconds in duration and have a high state represented by 2.4 kHz and a low state represented by 1.2 kHz. The leading edge 40a of each bit 41 is defined by 2.4 kHz signal having a duration of 8.33 milliseconds and the trailing edge 40d of each bit is defined by a 1.2 kHz signal, also 8.33 milliseconds long. The segments 40b and 40c define the bit 41 as high or "1" by a signal which is 40 cycles at 2.4 KH and as low or "0" by a signal which is 20 cycles at 1.2 KH. By using this approach, the individual bits 41 in a stream of bits can always be identified since leading and trailing edges 40a and 40b are always different regardless of the state of the bit.

The bits 41 are organized into a data stream, designated generally by the numeral 43, which for purposes of this example is read in the direction of arrow 44 from right to left. Prior to scanning the chestnuts 30a-30d of a horse, an assigned number or application number is red into bytes 45a-45f. Interleaved between the digits or bytes of the application number 45a-45f, are digits 46a-46f which form the serial number of the camera 21 or apparatus 20. As is conventional, each digit 45a-45f and 46a-46f is formed of four bits 41. Preferably, the application number 45a-45f is dialed into the encoding circuitry 25 contained in the belt pack 22 and the serial number 46a-46f is factory-set.

The next eight bits 41 in the data stream 43 are reserved for an eight bit code word 47 which is always a high or "one". The bits 41 of the code word 47 separate the "application number" 45a-45f and "serial number" 46a-46f from a chestnut description which is described by a seven digit number having component numbers 48, 49 and 50 relating to the dimensional parameters of width, height and area, respectively, derived by scanning one of the chestnuts 30a-30d (see FIG. 2). Each of the numbers 48, 49 and 50 are separated by a single high bit 51. The numbers 48 and 49 representing width and height of a chestnut are two digit numbers defined by seven bits while the number 50 representing the area of the chestnut is a three digit number defined by eight bits.

After a stream 43 of bits 41 is obtained for one leg, the scanner 21 is moved to another leg and a second stream of bits is accumulated. Preferably, the legs are scanned in the following sequence: right front leg, right rear leg, left rear leg and left front leg. Each scan takes approximately 2.66 seconds to record and examination of an entire horse includes a total scan time of 10.66 seconds during which time a data format of 320 bits is accumulated. As is readily seen, the process may be accomplished very rapidly, and a scan of all four chestnuts 30a-30d will perhaps consume no more than half-a-minute in total time including the time necessary to move the scanner 21 from leg to leg. Accordingly, the scanning technique in accordance with the instant invention can be accomplished rapidly enough so that the identification process can be used without interfering with other procedures.

Figures 5A, 5B, 6:
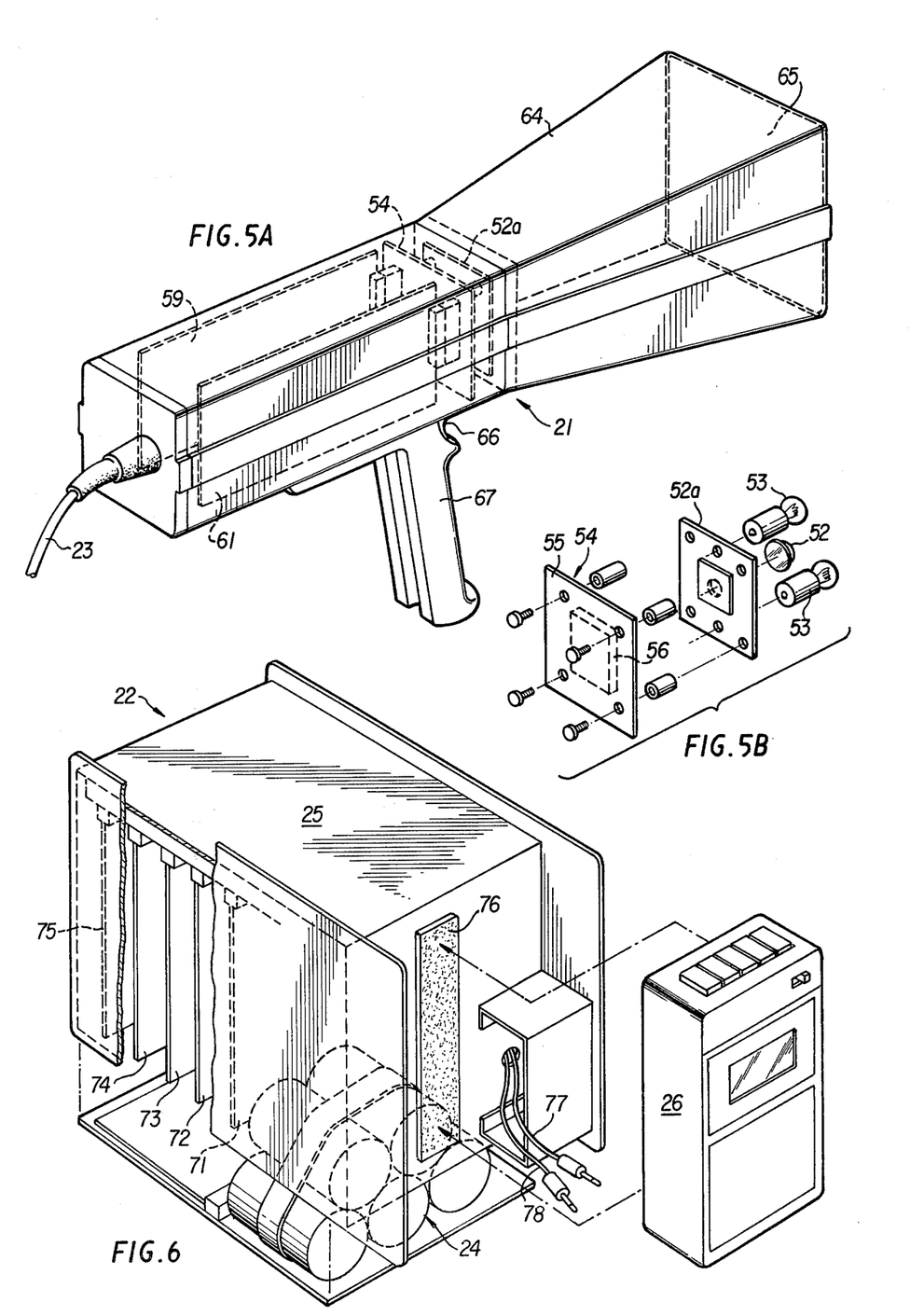

FIG. 5—THE SCANNER 21

The bits 41 in the data stream 43 originate in the scanner 21 which includes a lens 52 through which an image of one of the chestnuts 30a-30d is focused after being illuminated by lamps 53. The image is focused on an optical sensing head 54 by the lens 52. The optical sensing head assembly 54 includes a sensor array printed circuit 55 on a printed circuit board 55a which mounts a solid state, photoelectric image sensor 56 which is preferably a charge coupled device, such as Model Number CCD202, marketed by Fairchild Semiconductor. The image sensor 56 includes an array of one hundred horizontal rows and one hundred vertical columns which define ten thousand image sensing elements; one for each intersection of a row and column. The ten thousand elements are contained within an area of four milimeters by three milimeters. The lens 52 reduces the image of the chestnut being scanned to an area which lies within the boundaries of the image sensor 56.

Electrically connected to the back of the optical sensing head assembly 54 are printed circuit boards upon which are mounted clock driver circuitry 57 and power supply circuitry 61. In order to obtain the data stream 43 of FIG. 4, the clock driver circuit 57 digitally pulses the sensor array circuit 55. The sensor array circuit 55 is first pulsed in the horizontal direction to obtain the width of the chestnut 30, represented by byte 48 and is then pulsed in the vertical direction to obtain the height of the chestnut 30, represented by byte 49 (see FIG. 4). Finally, a count is made of the number of sensors activated on the image sensor to determine the area of the chestnut 30, represented by byte 50 (see FIG. 4). The power supply circuitry 61 powers the clock driver circuitry 57, the image sensor array circuitry 55 and lights the lamps 53. The elements 52 and 50 are contained within a hood 64 to shield them from ambient light. The hood 64 has an open end 65 which is aligned with one of the chestnuts 30a-30d and placed thereover. A trigger 66 on a pistol grip handle 67 is pressed to light the lamps 52 and to activate the circuitry within the scanner 21 so as to obtain the stream of data 43 from image sensor 56.

FIG. 6—BELT PACK 23

Referring now to FIG. 6, where the belt pack 23 is shown, the belt pack includes a main housing 70 in which is contained the battery pack 24 and five printed circuit boards which mount synthesis circuitry 71, interface circuitry 72, control circuitry 73, encoder circuitry 74, and modem circuitry 75. The tape recorder 26 is detachably secured to the main housing 70 by a strip of velcro tape 76 and is connected to the circuits 71-75 by leads 77 and 78. It is necessary to make the tape recorder 26 detachable from the housing 70 so that the data on the tape may be transmitted conveniently via the telephone lines 31 to the central data bank 32 (see FIG. 2).

Figure 7:
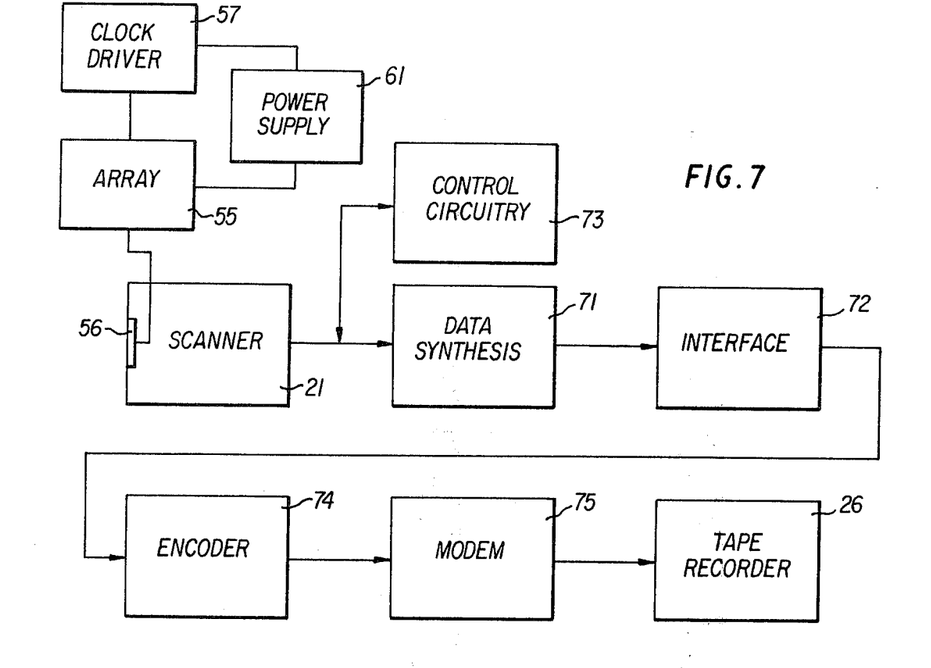
FIG. 7 is a block diagram generally showing the system of the instant invention.

FIG. 7—GENERAL DESCRIPTION OF THE SYSTEM

FIG. 7 is a block diagram showing the flow of data from the scanner 21 to the tape recorder 26. FIG. 7 provides a transition between the mechanical presentations of FIGS. 1 through 6 and the electrical presentations of FIGS. 8 through 15. The scanner 21 receives the image of the chestnut on image sensor 56. The power supply circuitry 61 converts 6 volt d.c. battery voltage from battery pack 24 (FIG. 6) to a 15 volt d.c. supply where necessary, as for example to power the array sensor 56. Moreover, the power supply circuitry 61 provides and controls the lamp voltage and provides some video processing derived from the array printed circuit 55. The clock driver circuitry 57 provides the clock drive signals necessary for proper operation and coordination of the sensor array 56 and other circuits.

Within the belt pack unit 23, the data synthesis circuitry 71 divides information derived from the camera 21 into formats required to define the dimensional paramaters of the width, height and area of the chestnut being scanned. This is accomplished by counting the lines involved in scanning the array and deciding which type of information is applicable to the different functions i.e., width, height or area. Count outputs indicative of each characteristic produced by the data synthesis circuitry 71 are applied to the interface circuitry 72. The interface circuitry 72 combines the count information from the data synthesis circuitry 71 with the application number assigned to the horse being scanned and scanner serial number and combines them into the format shown in FIG. 4. In other words, the interface circuitry 72 arranges the numbers 45a-45f and 46a-46f in proper order, inserts the eight bit word code 47 and then attaches to that information the chestnut width, height and area numbers 48, 49 and 50, respectively, separating the numbers with the high bits 51 (see FIG. 4).

The control circuitry 73 provides control signals to various parts of the apparatus 20. As the trigger 66 on the grip 67 of the camera 21 is pulled, a signal is sent to the control circuitry 73 so as to start the sequence of events which processes the optical information received from the chestnut 30 being scanned. The control circuitry 73 instructs the clock circuitry 57 to initiate operation of the array circuitry 55, provides a start pulse which synchronizes the scan of the array and provides clock pulses to the encoder circuitry 74 and the modem circuitry 75.

The encoder circuitry 74 is used to encode the application number 45a-45f and scanner serial number 46a-46f into the data stream 43 with the chestnut numbers 48, 49 and 50. The serial number is inputted into the system at the factory by utilizing a breakout type of chip in which metal tabs appearing between various pins on an integrated circuit are physically "broken out" to set in the BCD number 46a-46f corresponding to the alpha numeric serial number. The application number 45a-45f may be applied to the encoder circuitry 74 by using a series of thumbwheel switches on the exterior of the housing 70 of belt pack 23 so as to in effect dial in the application number.

The output of the number encoder circuitry 74 is applied to the modem circuitry 75 which produces tones that are recorded in the tape recorder 26. In essence, the modem circuitry 75 converts the data stream 43 to the four tone segments shown in format 40 (FIG.

4) required to define a single bit 41 on the magnetic tape.

The following discussion sets forth the aforedescribed circuitry in more detail considering each circuit individually and relating the inputs and outputs of that circuitry to other circuitry in the system.

Figure 8:
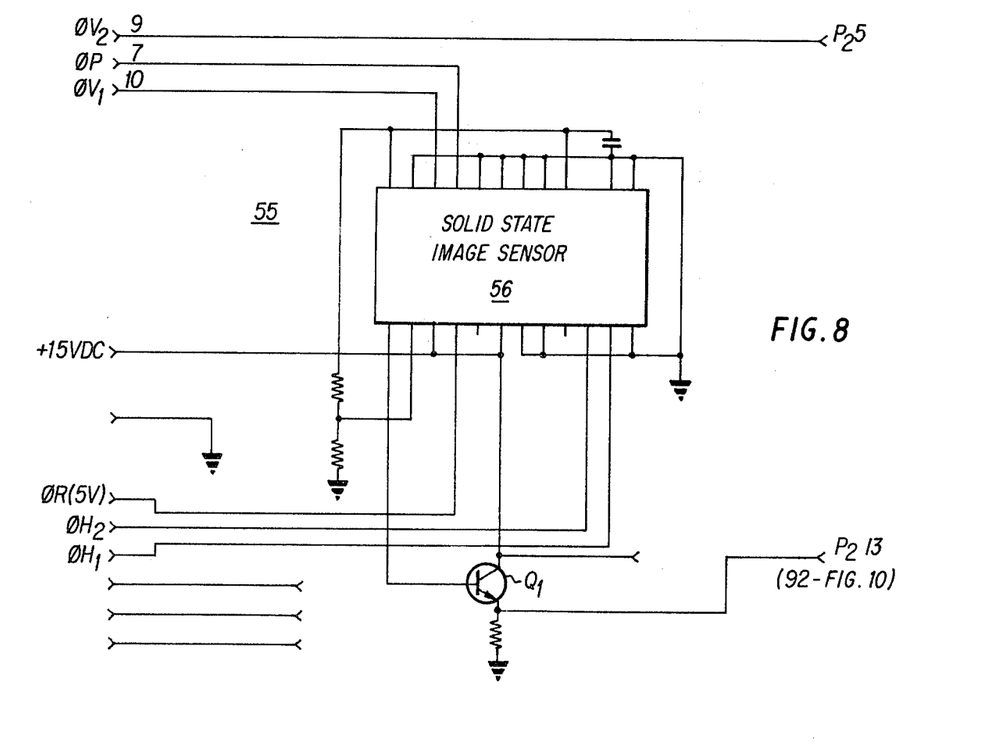
FIG. 8 is a circuit diagram showing an optical sensor upon which an image of a chestnut is focused and showing sensor array circuitry.

FIG. 8—SENSOR ARRAY CIRCUITRY 55

The sensor array circuitry 55 within the scanner 21 consists of the charge coupled, image sensor chip 56 which is mounted on the printed circuit board 55a. The printed circuit board 55a simply serves to provide connecting points to the chip 56. The clock circuitry 57 (FIG. 9) supplies the chip 56 with photogate and reset clock signals $\theta$ P and $\theta$ R and two-phase horizontal and vertical clock signals $\theta$ V1, $\theta$ V2, $\theta$ H1 and $\theta$ H2, while the power supply circuitry 61 (FIG. 10) provides 15 volts d.c. to the chip. The chip 56 has a video output that is buffered by transistor Q1 and applied to an output P2 13 which is connected to the power supply circuitry 61 (FIG. 10).

Figure 9A:
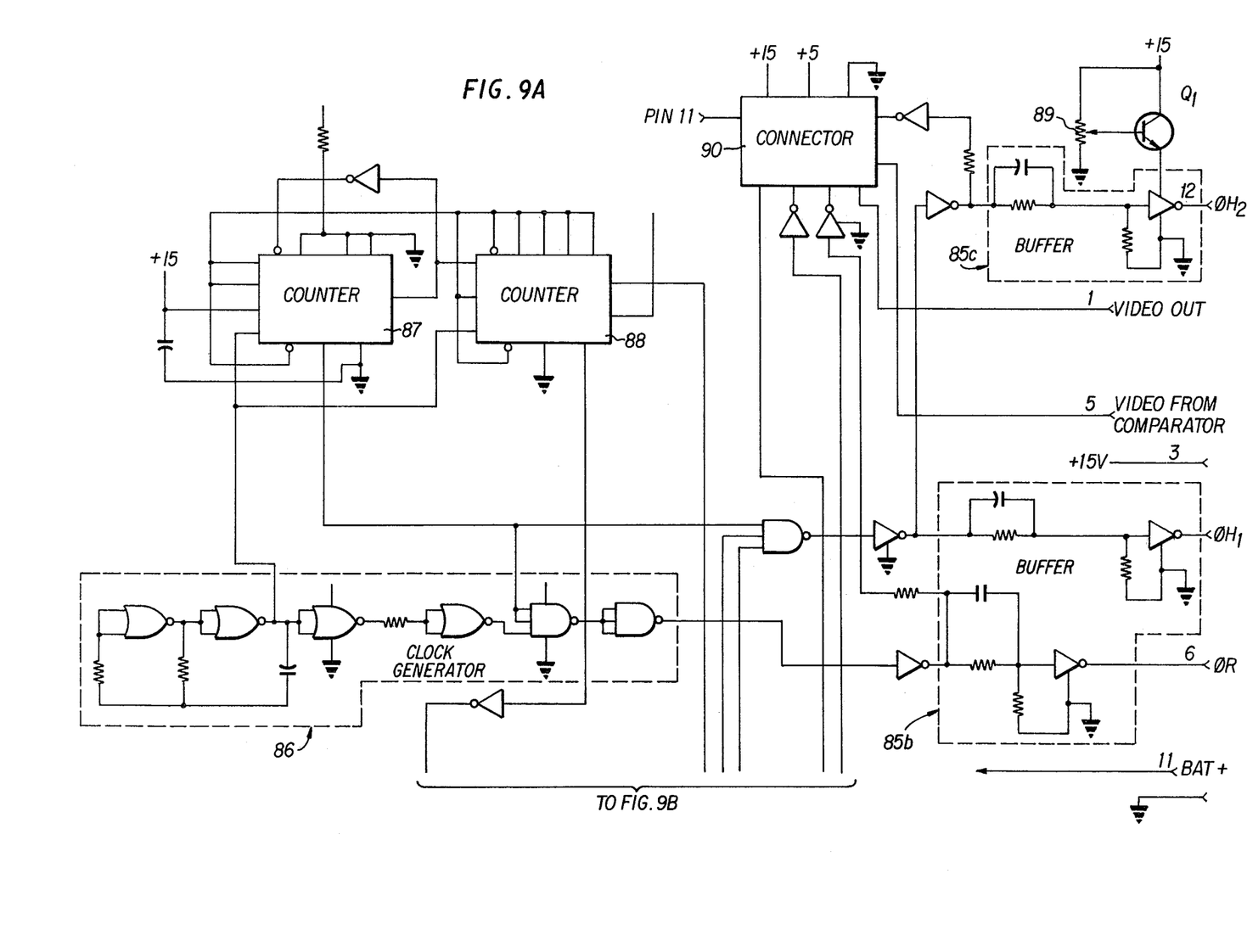
FIGS. 9A and 9B are circuit diagrams of clock driver and synchronous generator circuitry.
Figure 9B:
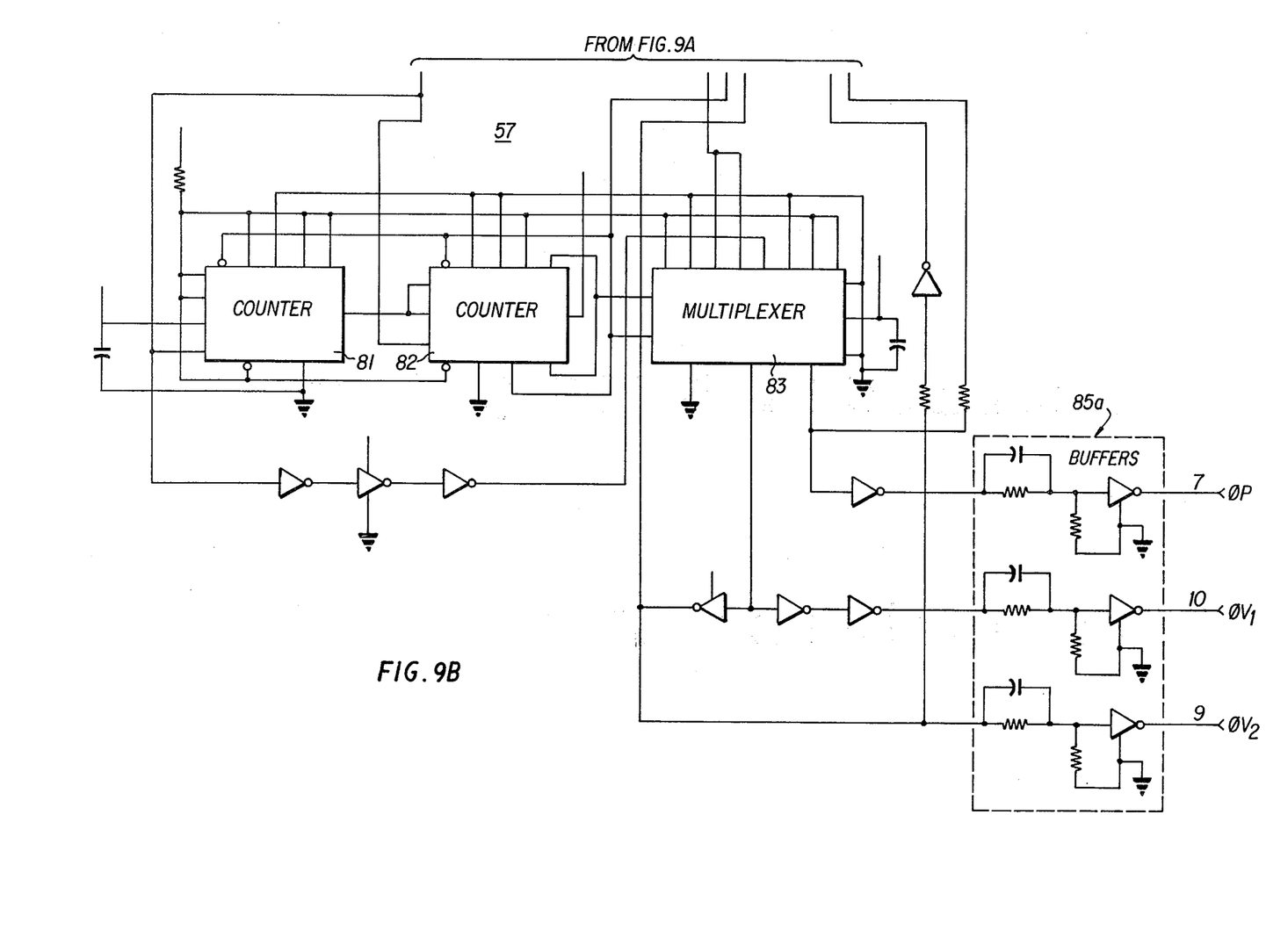
Figure 10:
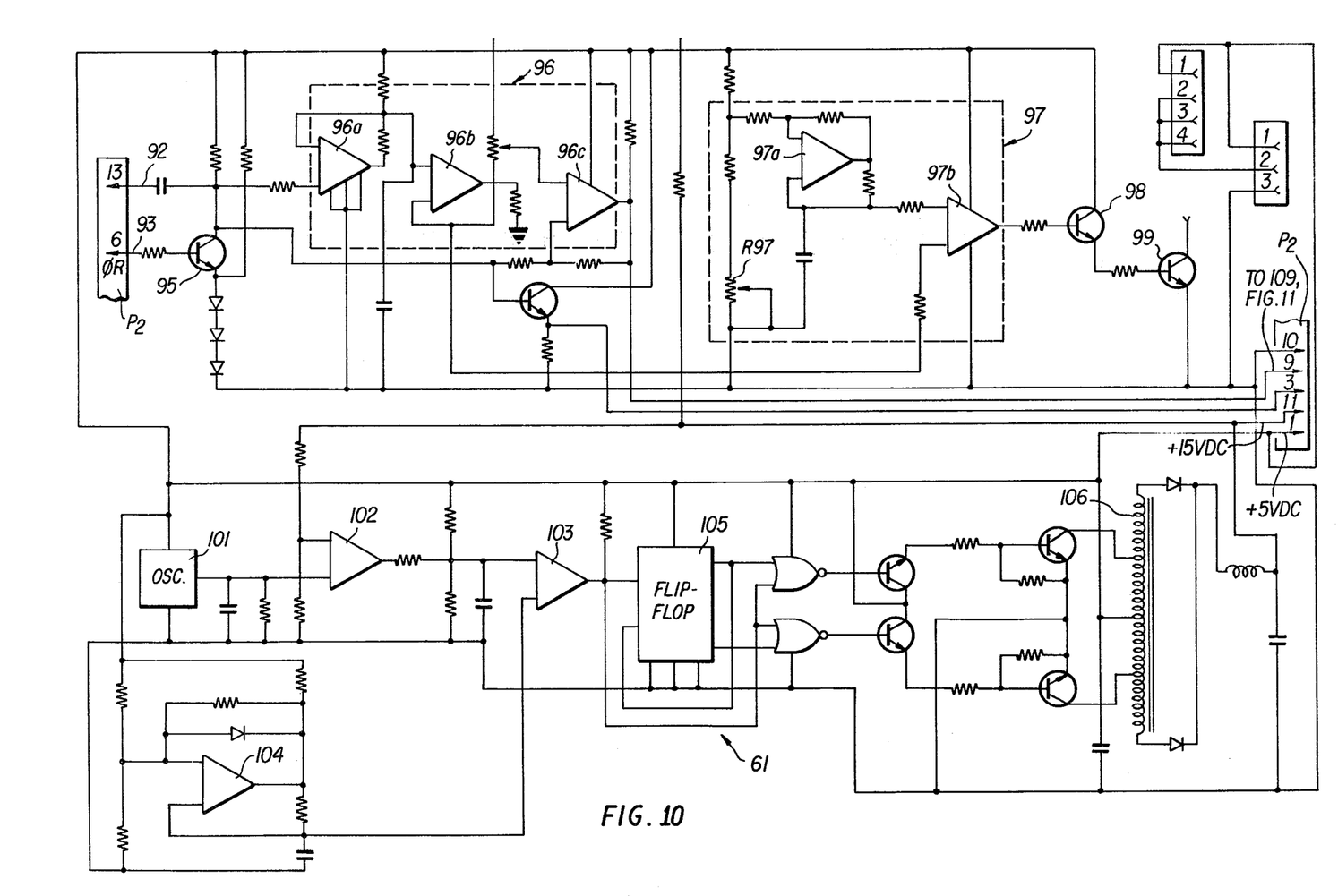
FIG. 10 is a circuit diagram showing power supply circuitry.

FIG. 9—CLOCK DRIVER AND SYNCHRONOUS GENERATOR CIRCUITRY

Referring now to FIG. 9, the clock signals labeled $\theta$ P, $\theta$ R, $\theta$ V1, $\theta$ V2, $\theta$ H1 and $\theta$ H2 are derived from the clock driver and synchronous generator circuitry 57 shown in FIG. 9. The clock circuitry 57 relies on counters 81 and 82 and a multiplexer chip 83. Primarily, the clock circuitry 57 is a countdown system which provides the clock signals at certain times within the countdown in order to clock out the optical information on the illuminated area of the optical sensor array chip 56. The signals are configured in buffering and shapping circuits 85a, 85b and 85c before being applied to the optical sensor array chip 56. The counters 87 and 88 are driven by a clock generator circuit 86 the outputs of which are divided by counters 81 and 82 before being applied to counters multiplexer 83.

The $\theta$ H2 clock signal requires a very precise level setting in order to be used by the particular sensor chip 56 being used. This setting is accomplished by factory adjustments of resister 89 connected to the base of a transistor Q1.

Connector 90 is a socket which connects the circuitry of FIG. 9 to the belt pack 24 via cable 23.

FIG. 10—SCANNER POWER SUPPLY 61

Referring now to FIG. 10, the video output signal from the image sensor 56 on output P₂ 13 (see FIG. 8) is applied over lines 92 to the power supply circuitry 61 where it is applied directly to a comparator circuit 96 comprising three voltage comparators 96a, 96b, and 96c. The clock signal $\phi$R is applied to pin 6 of P₂. The video signal from the output of the comparator 96b to evaluate overall picture brightness is applied to a level detection circuit 97 which selects the brightest element on the sensor array and uses that as a reference for all decisions made by the comparator 96. Accordingly, with the evaluating circuitry 96 and 97 the video information can be evaluated so that a determination is made as to whether or not there is sufficient brightness to be above a comparison level set by variable resistor R97 and voltage comparator 97a. Consequently, a video signal is derived from the output of comparator 96c which is representative of the bright chestnut area or outline. The comparator 97b samples the level of video information and controls transistors 98 and 99 so as to adjust the output thereof and therefore the intensity of light provided by the lamps 53 used to light the chestnut being scanned. If the illuminated area is darker than normal, the evaluating circuitry 96 and 97 will adjust the power to the lamps 53 to provide a brighter light so as to compensate for phenomenon such as aging of the lamps and a video signal which can be reliably processed in subsequent circuitry. Oscillator 101, voltage comparators 102-104, flip-flop 105, and transformer 106 form a circuit to accurately developing and controling the voltage level in the scanner 21 so that a +15 volt d.c. level is always maintained.

Figure 11:
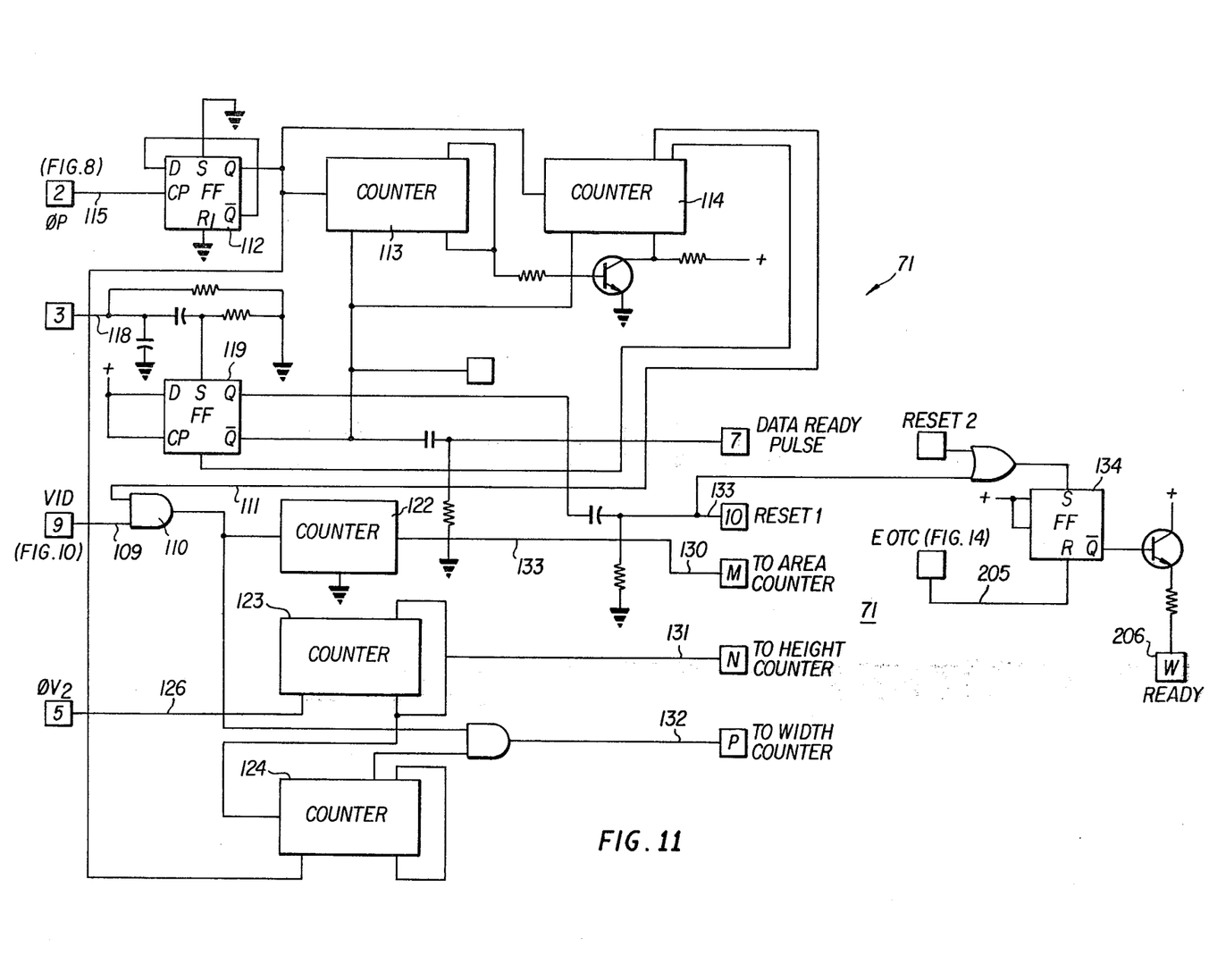
FIG. 11 is a circuit diagram showing data synthesis circuitry for counting pulses which establish parameters describing the chestnuts.

FIG. 11—DATE SYNTHESIS CIRCUITRY 71

A qualified video signal which is outputted from the comparator circuit 96c produces a video signal which is pumped over cable 23 to the belt pack unit 22 where it enters the data synthesis circuitry 71 of FIG. 11 over line 109. The signal is first gated by gate 110 with a signal on line 111 that describes one scan of the optical sensor 56 by the array circuitry 55. Flip-flop 112, counter 113, and counter 114 receive an $\phi$P input from the optical element 56 over line 115 and, in essence, sample one picture frame during one scan of the array immediately after the trigger 66 (see FIG. 5) places an input on line 118 through a flip-flop chip 119. The chip 114 $\phi$R provides the system with a delay which allows the intensity of lamp 52 to stabilize after the trigger 66 is pulled and allows the comparators 96 and 97 of FIG. 10 to stabilize so that a good representation of the chestnut 30 is achieved before the signal is gated by gate 110 into counter chips 122, 123, and 124 which manipulate the video signal and clock signal inputted over lines 109 and 126 respectively to count pulses indicative of the width 48, the height 49, and area 50 (see FIG. 4) of the horse chestnut respectively. The outputs of counters 122, 123 and 124 are applied over lines 130, 131 and 132 to the interface circuitry 72.

Flip-flop 119 also provides a reset pulse on line 133 which is used to reset various components throughout the system and is also applied to set a flip-flop 134 which extinguishes a ready light 206 while the system is scanning.

Figure 12:
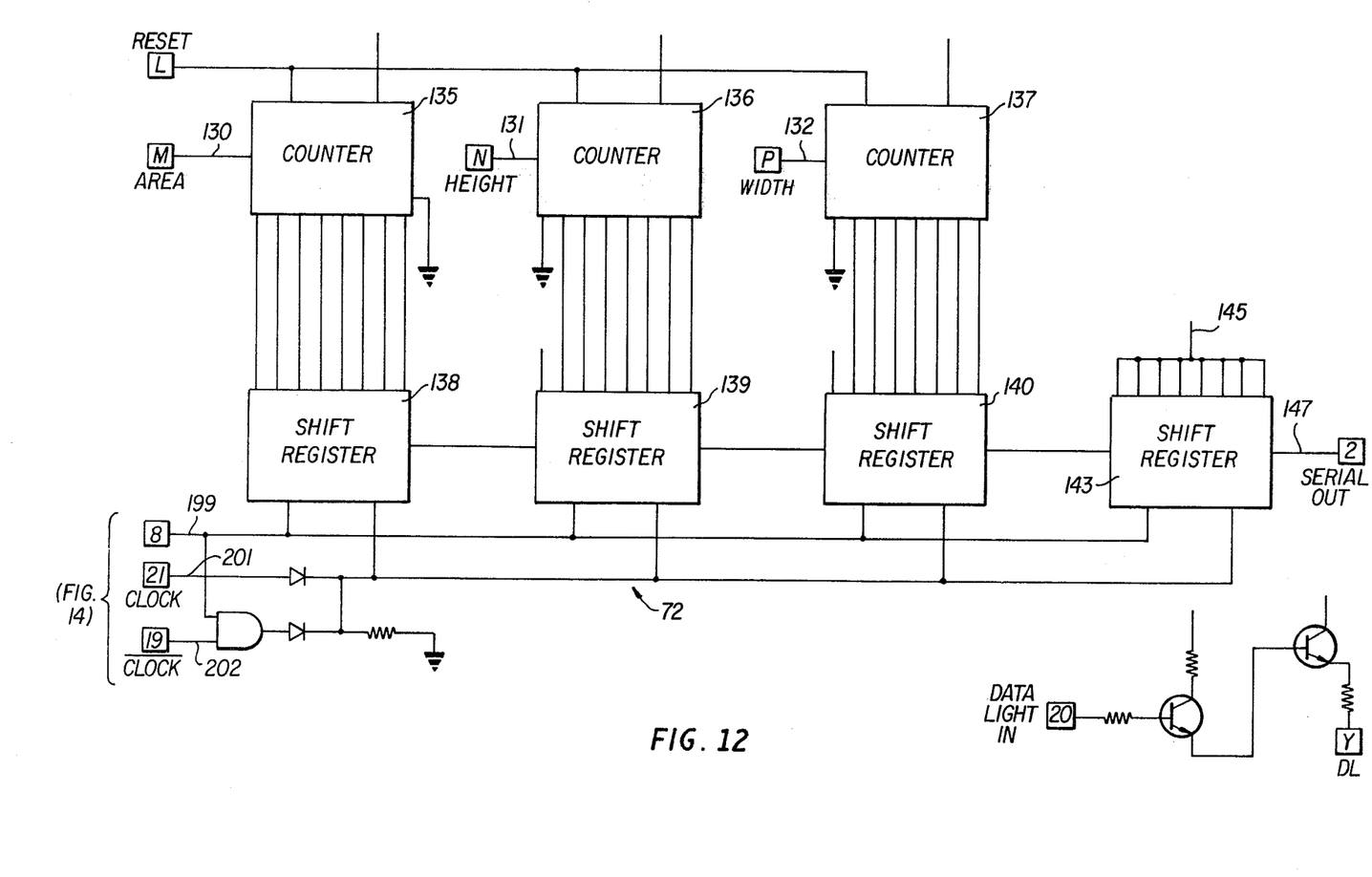
FIG. 12 is a circuit diagram of interface circuitry for combining chestnut parameters with other numbers in the systems.

FIG. 12—INTERFACE CIRCUITRY 72

The interface circuit 72 has three sets of counters 135, 136 and 137 which count area, height, and width pulses, respectively, received over lines 130, 131 and 132. The pputput of counters 135, 136 and 137 are parallel loaded into three shift registers 138, 139 and 140 while the code word 47 (see FIG. 4) is developed in register 143 by loading "1's" into each input from bus 145. By parallel loading the information from the counters 135, 136, 137 and 143, the chestnut parameter numbers 48, 49 and 50 of the stream 43 of bits 41 seen in FIG. 4 are applied over line 147 to the encoder circuitry 74 of FIG. 13.

Figure 14:
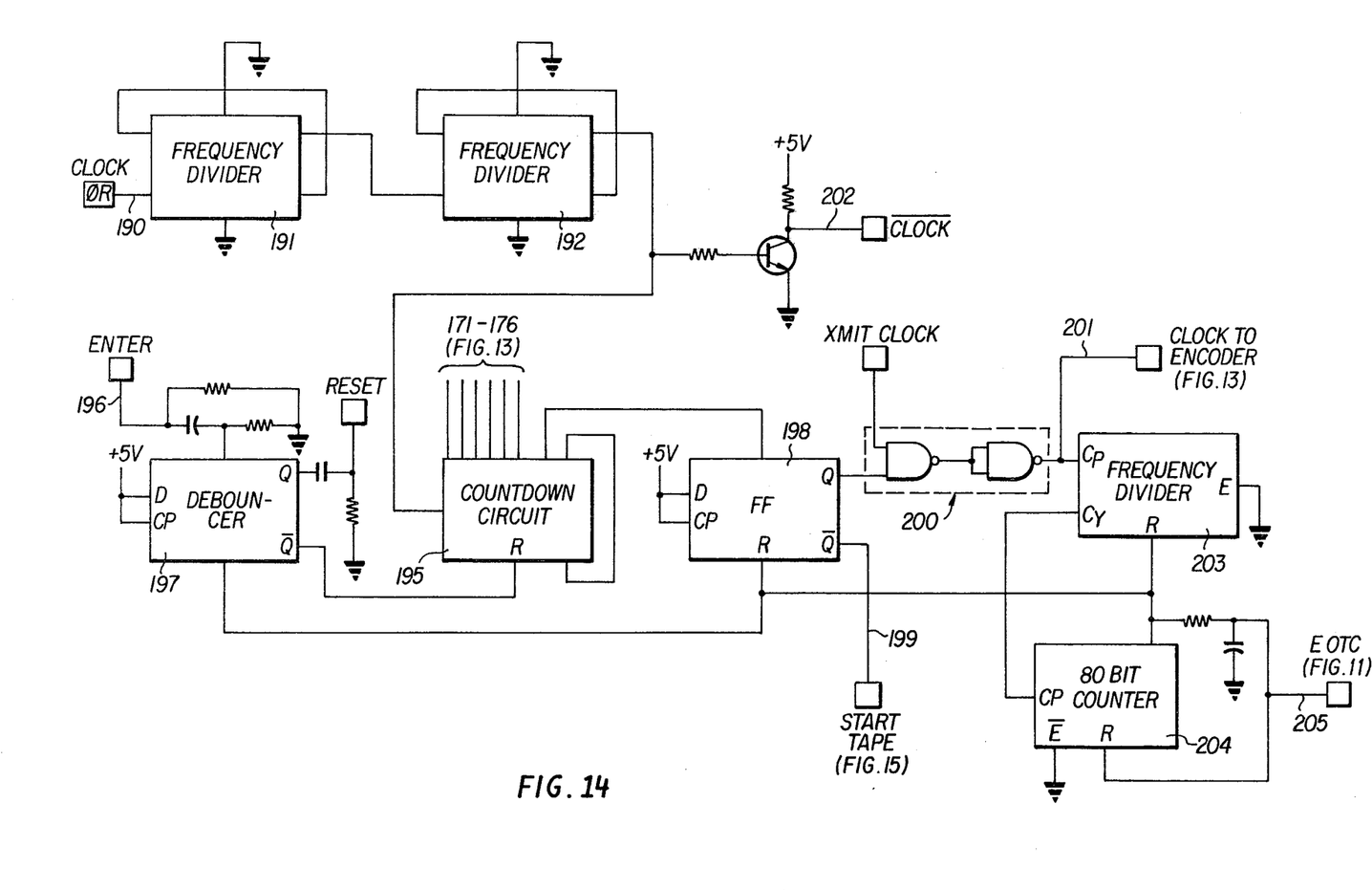
FIG. 14 is a circuit diagram of control circuitry which among other functions controls operation of the encoder circuitry.

The clocking for shift registers 138, 139 and 140 and for the shift register 143 is provided by clock and inverted clock signals on lines 201 and 202 respectively from the control circuitry of FIG. 14. In addition a signal is applied over line 199 from FIG. 14 to latch the shift registers 138-140 before the shift registers are shift out to register 143 in order to keep the counters 135-137 from effecting the registers 138-140 while they are shifting.

Figure 13:
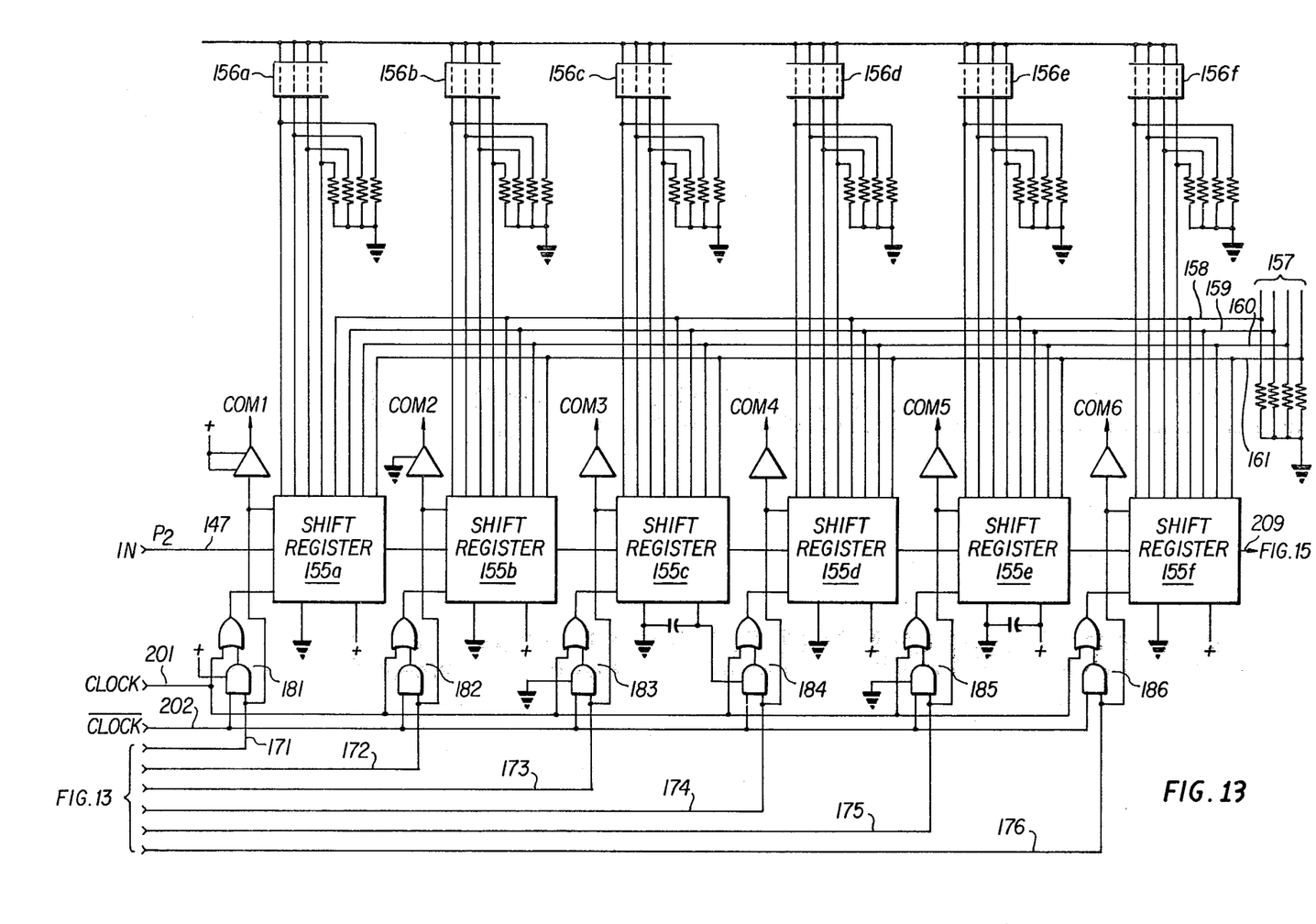
FIG. 13 is a circuit diagram of number encoder circuitry for inputting assigned numbers.

FIG. 13—ENCODER CIRCUITRY 74

The encoder circuit 74 is parallel loaded with a six-digit scanner serial number 46a–46f by six breakout devices 156a–156f. Thumbwheel switches in belt pack unit 23 and connected to lines 157 are used to dial in the application number 45a–45f. The thumbwheel switches connected to lines 157 apply the application number over lines 158, 159, 160 and 161 in a bus format to each of the shift registers 155a–155f. As information is loaded in the shift registers 155a–155f, the lines 158–161 are interrogated sequentially. The orchestration for coordinating the signal applied over line 147 with the serial number from breakout chip 156 and application number from thumbwheel switch 157 is controlled by inputs over lines 171–176 from the control circuit 73 of FIG. 14 which are applied through gates 181–186 to the shift registers 155a–155f. COM1-COM6 provide enabling pulses to common sides of the thumbwheel switches 156a–156f, respectively in order to serially operate the thumbwheel switches.

FIG. 14—CONTROL CIRCUITRY 73

The control circuitry 73 utilizes a clock signal $\theta$ R, which has been slowed to a usable rate by frequency dividers 191 and 192 and applied to a count down circuit 195 in order to provide outputs 171–176 so as to accomplish loading, scanning and movement of data upon squeezing the trigger 66 (see FIG. 5). The count down circuit 195 is reset by an "ENTER" signal on line 196 from the trigger 66 (FIG. 5) which is applied through a debouncer circuit 197. The debouncer circuit 197 also resets a flip-flop 198 which applies a signal over line 199 to the motor (see 251 FIG. 15) of the tape recorder (see 26 FIG. 1). Flip-flop 198 is also triggered by count down circuitry 195 at the end of the loading sequence for shift registers 155a–155f of FIG. 13 to enable clock 200 which initiates via line 201 of the signals on lines 171–186 through gates 181–186 of FIG. 13, the gates 181–186 having previously been readied by a clock signal applied over line 202. The clock and clock signals on line 201 and 202 are also applied to the interface circuitry of FIG. 12 to shift the chestnut data through shift registers 138–143 out over line 147 to the shift registers 155a–155f of FIG. 13 behind the application and identification number data.

In addition, the output from clock 200 is applied to a divide-by-ten frequency divider 203 which starts an eighty-bit counter 204 that provides an end of transmission clock signal "EOTC" on line 205 after data in the encoder circuitry 74 of FIG. 13 has been sifted out. The "EOTC" signal is applied to an indicating light 206 (FIG. 11) in the data synthesis circuitry 71 (FIG. 11) indicating that one of the chestnuts 30a–30d (FIG. 2) has been recorded and the scanner 21 is ready to be moved to another chestnut.

Figure 15:
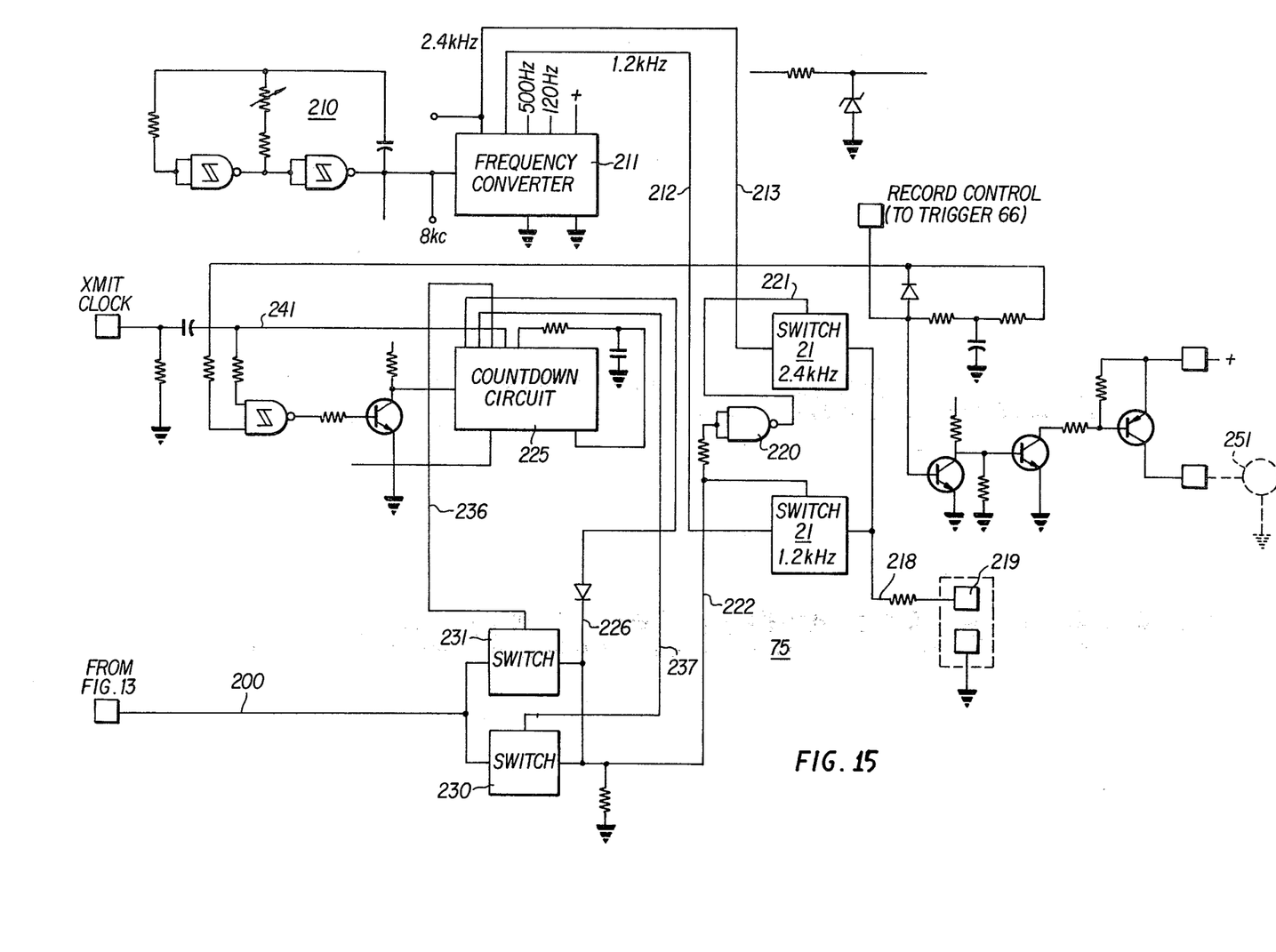
FIG. 15 is a circuit diagram of modem circuitry which converts digital data into tones for recording on tape.

FIG. 15 CIRCUITRY FOR FORMING THE MODEM BIT FORMAT 40 OF FIG. 4

The data applied to line 209 by the encoder 74 of FIG. 13 is in the form of high and low bits 41 which are organized into the data stream 43. In order to provide effective mechanism for recording the data stream 43 on the magnetic tape within the tape recorder 26 it is necessary to formulate the modem bit format 40 issuing a series of tones. As is seen in FIG. 3, the modem bit format 40 is divided into four segments 40a, which is the leading edge, 40b and 40c which define whether the bit is high or low and 40d which is the trailing edge. Each of the four segments 40a–40d utilizes a high tone having a frequency 2.4 kHz and a low tone having a frequency of 1.2 kHz. As stated before, the leading edge of each bit 41 is always 2.4 kHz and the trailing edge of each bit is always 1.2 kHz in order to separate the bits from one another.

The tones recorded on the tape are provided by a master oscillator 210 which supplies an 8 kHz tone that is divided by frequency divider 211 into a 1.2 kHz output on line 212 and a 2.4 kHz output on line 213. These outputs are in turn applied to switches 214 and 215 which apply either the 2.4 or 1.2 kHz signal over line 218 to the microphone input 219 of the tape recorder 26. The switches 214 and 215 are operated by an inverter 220 that will apply a high output over line 221 to switch 214 when there is a low on line 222 through switch 215 and a low output over line 221 when there is a high on line 222 so that either switch 214 is applying the 1.2 lHz signal to line 218 or switch 215 is applying the 2.4 kHz signal to line 218. The state of line 222 is controlled by a countdown circuit 225 which normally maintains a low on line 226 that is connected directly to line 222. Also connected to line 226 are a pair of switches 230 and 231 which receive the output from the encoder circuitry 74 of FIG. 13 over line 200. The switch 231 provides a high pulse of a duration lasting three segments 40a, 40b and 40c of the modem bit format 40 when a high is received over line 200. When there is a low received over line 200 switch 230 applies a high signal on line 222 for one segment 40a of the modem bit format 40 and thereafter allows the state on line 222 to return to 0. The switch 231 has a clock input connected to counter 225 by a line 236 while the switch 230 has a clock input connected to counter 225 by a line 237. The duration of highs which always define segments 40a to indicate presence of a pulse and which occur in segments 40b and 40c when the pulse is high are determined by clock inputs on lines 237 and 236. A carrier pulse of 120 Hz is applied over line 240 to the counter 225 and a clocking pulse is applied over line 241 to the counter 225.

A motor 251 advances the recorder tape past the tape head connected to the microphone input 219 when the trigger 66 of FIG. 5 is pressed so that the stream of data 43 is sequentially recorded on the tape.

By utilizing the aforedescribed arrangement the optical image of the horse chestnuts 30 is converted to a stream of digital numbers which are recorded on a tape for subsequent references.

The foregoing illustration is merely illustrative of the invention which is to be limited only by the following claims:

I claim:

1. A method of utilizing a data processing system to authenticate the identity of a horse by generating a digital code number which is related to physical characteristics distinguishing that horse from all other horses, the method comprising the steps of:
    (a) storing in the system an assigned number particular to the horse,
    (b) optically scanning each of the horse's chestnuts in sequence to produce an electrical output indicative of characteristics corresponding to the configuration of the chestnuts,
    (c) converting the output of each scan into a digital signal relating to the dimensional parameters of the chestnut, (d) combining the outputs from each converting step with a serial number of the system and said assigned number to produce a digital code number, and (e) recording the digital code number on a magnetic medium.

2. The method of claim 1 further including the step of converting the digital code to an acoustical signal and storing the acoustical signal on tape.

3. The method of claim 2 wherein the acoustical signal is initially stored locally on tape and further including the steps of transmitting the signal subsequently to a central data station.

4. An apparatus for optically scanning the chestnuts of a horse to derive digits representing characteristics of the horse's chestnuts by which the horse can be uniquely identified, the apparatus comprising:

(a) a solid state image sensor, (b) a hood positioned in front on the image sensor for excluding ambient light, the hood having an open end remote from the image sensor for positioning around a chestnut of a horse, (c) illuminating means within the hood for illuminating the open end of the hood and any chestnut there positioned, (d) a lense in front of the image sensor for focusing an image on the image sensor of any chestnut positioned at the open end of the hood, (e) a clock driver circuit connected to the image sensor for clocking out of the image sensor pulses indicative of the image sensed, (f) evaluating means connected to an output of the image sensor for evaluating the output level of the pulses indicative of the image sensed, (g) data synthesis means connected to an output of the evaluating means for synthesizing data from the pulses indicative of the image sensed, and (h) an encoder means for encoding at least one number to be combined with the data from the data synthesis means, thereby forming a code number by which a horse can be uniquely identified, the encoder means comprising two devices for encoding numbers, one device being set as a serial number of the apparatus and the other device being adjustable to reflect an application number arbitrarily assigned to a horse.

5. The apparatus of claim 4 wherein the data synthesis means comprises a gate connected to an output of the clock driver circuit and to an output of the evaluating means for admitting the pulses indicative of the image sensed from only a single frame after the output level is qualified.

6. The apparatus of claim 5 wherein the data synthesis means further comprises a plurality of registers connected to an output of the gate, each of the plurality of the registers counting and storing a number indicative of a characteristic of the image sensed.

7. The apparatus of claim 6 wherein there are three registers which derive a number indicative of the area, height, and width of the image of the chestnut sensed.

8. The apparatus of claim 4 further comprising a modem and magnetic data recorder connected to an output of the data synthesis means for recording the data which can uniquely identify the horse on a magnetic medium.

9. An apparatus for optically scanning the chestnuts of a horse to derive digits representing characteristics of the horse's chestnuts by which the horse can be uniquely identified, the apparatus comprising:

(a) a solid state image sensor, (b) a hood positioned in front on the image sensor for excluding ambient light, the hood having an open end remote from the image sensor for positioning around a chestnut of a horse, (c) illuminating means within the hood for illuminating the open end of the hood and any chestnut there positioned, (d) a lense in front of the image sensor for focusing an image on the image sensor of any chestnut positioned at the open end of the hood, (e) a clock driver circuit connected to the image sensor for clocking out of the image sensor pulses indicative of the image sensed, (f) evaluating means connected to an output of the image sensor for evaluating the output level of the pulses indicative of the image sensed, (g) means connected to an output of the evaluating means and to the illuminating means for adjusting the power to the illuminating means in response to the output of the evaluating means to achieve an output level which is qualified for subsequent processing, (h) data synthesis means connected to an output of the evaluating means for synthesizing data from the pulses indicative of the image sensed, and (i) an encoder means for encoding at least one number to be combined with the data from the data synthesis means, thereby forming a code number by which a horse can be uniquely identified, the encoder means comprising two devices for encoding numbers, one device being set as a serial number of the apparatus and the other device being adjustable to reflect an application number arbitrarily assigned to a horse.

10. The apparatus of claim 9 further comprising data synthesis means connected to an output of the evaluating means for synthesizing data from the pulses indicative of the image sensed.

11. The apparatus of claim 10 further comprising an encoder means for encoding at least one number to be connected to the data from the data synthesis means thereby forming a code number by which a horse can be uniquely identified.

12. The apparatus of claim 11 wherein the encoder means comprises two devices for encoding numbers, one device being set as a serial number of the apparatus and the other device being adjustable to reflect an application number arbitrarily assigned to a horse.

* * * * *